(12) United States Patent
Kobayashi

(10) Patent No.: US 8,289,349 B2
(45) Date of Patent: Oct. 16, 2012

(54) CORRECTION METHOD

(75) Inventor: Koji Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 300 days.

(21) Appl. No.: 12/828,584

(22) Filed: Jul. 1, 2010

(65) Prior Publication Data

US 2011/0025887 A1 Feb. 3, 2011

(30) Foreign Application Priority Data

Aug. 3, 2009 (JP) ................. 2009-180736

(51) Int. Cl.
*G09G 5/10* (2006.01)

(52) U.S. Cl. ........................ 345/690; 348/241

(58) Field of Classification Search ............... 345/690, 345/204; 348/189, 241
See application file for complete search history.

(56) References Cited

U.S. PATENT DOCUMENTS

| | | | |
|---|---|---|---|
| 5,023,110 A | 6/1991 | Nomura et al. | |
| 6,097,356 A | 8/2000 | Fan | |
| 6,911,781 B2 | 6/2005 | Yamazaki et al. | |
| 7,456,579 B2 | 11/2008 | Yamazaki et al. | |
| 7,623,108 B2 | 11/2009 | Jo et al. | |
| 2003/0201727 A1 | 10/2003 | Yamazaki et al. | |
| 2005/0156831 A1 | 7/2005 | Yamazaki et al. | |
| 2005/0195178 A1 | 9/2005 | Jo et al. | |
| 2005/0206636 A1* | 9/2005 | Kanai | 345/204 |
| 2006/0022914 A1 | 2/2006 | Kimura et al. | |
| 2006/0066642 A1* | 3/2006 | Ookawara et al. | 345/690 |
| 2006/0066643 A1* | 3/2006 | Arai et al. | 345/690 |
| 2008/0136846 A1 | 6/2008 | Abe et al. | |
| 2009/0081816 A1 | 3/2009 | Yamazaki et al. | |

FOREIGN PATENT DOCUMENTS

| | | |
|---|---|---|
| JP | 2-56822 | 2/1990 |
| JP | 2000-122598 | 4/2000 |
| JP | 2004-145257 | 5/2004 |
| JP | 2005-250121 | 9/2005 |
| JP | 2006-047510 | 2/2006 |
| JP | 2008-145494 | 6/2008 |

* cited by examiner

*Primary Examiner* — Quan-Zhen Wang
*Assistant Examiner* — Yuk Chow
(74) *Attorney, Agent, or Firm* — Fitzpatrick, Cella, Harper & Scinto

(57) ABSTRACT

A correction value for luminance correction is determined by: measuring a luminance value of each display element by displaying a first image including luminance unevenness caused by characteristic differences among the display elements and characteristic differences among modulation circuits, and calculating a first luminance value serving as a representative luminance value of the display elements for each of the modulation circuits; measuring the luminance value of each of the display elements by displaying a second image in which the luminance unevenness caused by characteristic differences among the modulation circuits is smaller than that of the first image, and calculating a second luminance value serving as a representative luminance value of the display elements for each of the modulation circuits; and calculating a correction value corresponding to each modulation circuit using a value obtained by dividing the first luminance value by the second luminance value.

6 Claims, 14 Drawing Sheets

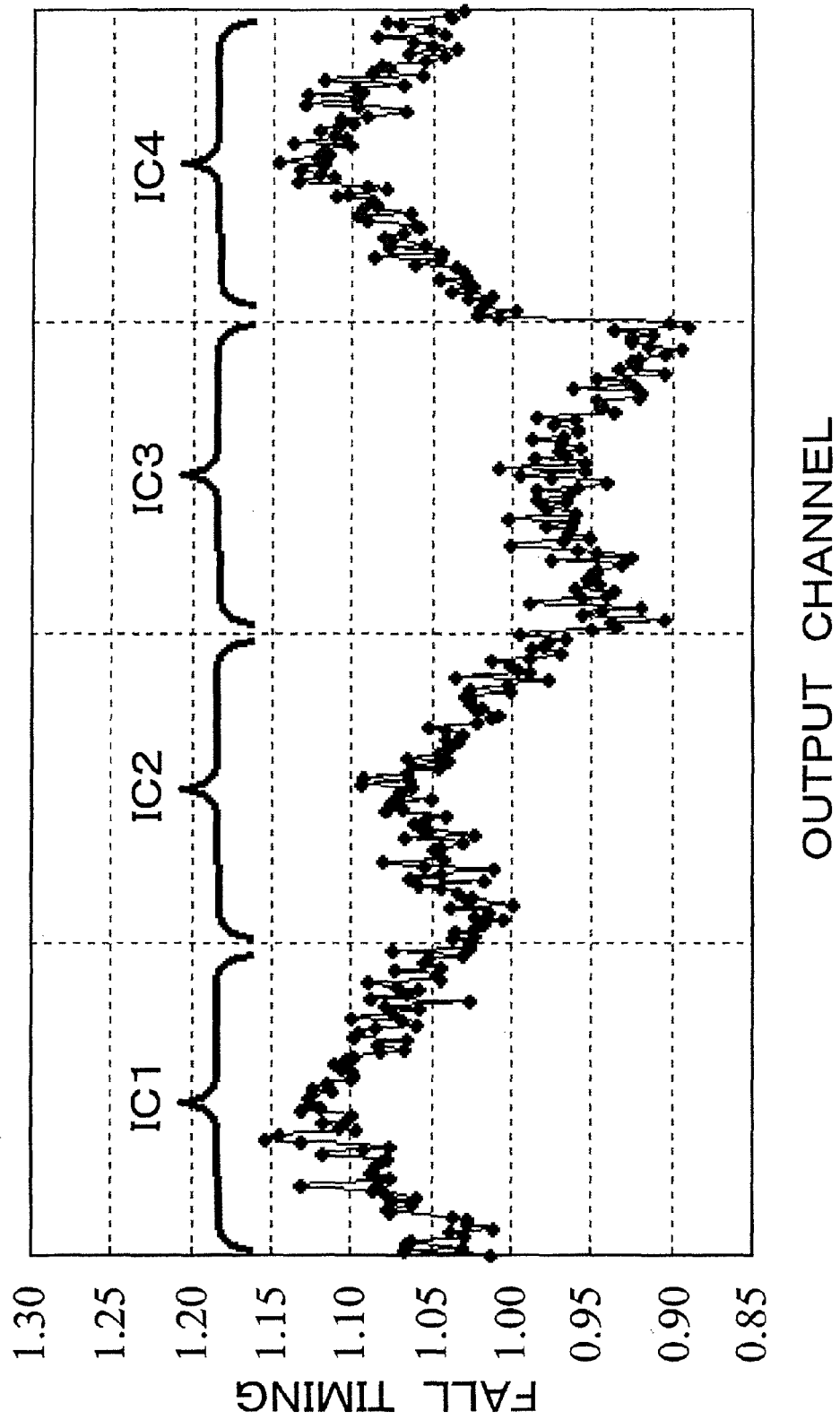

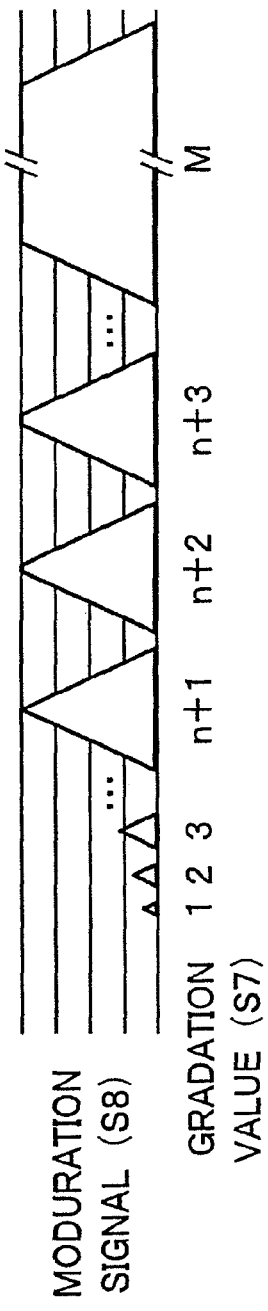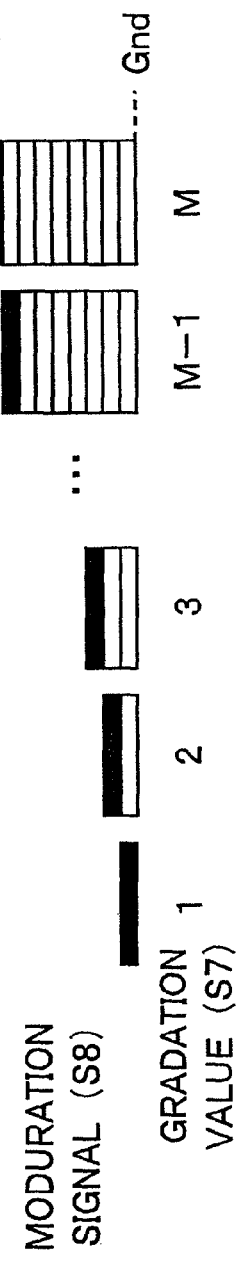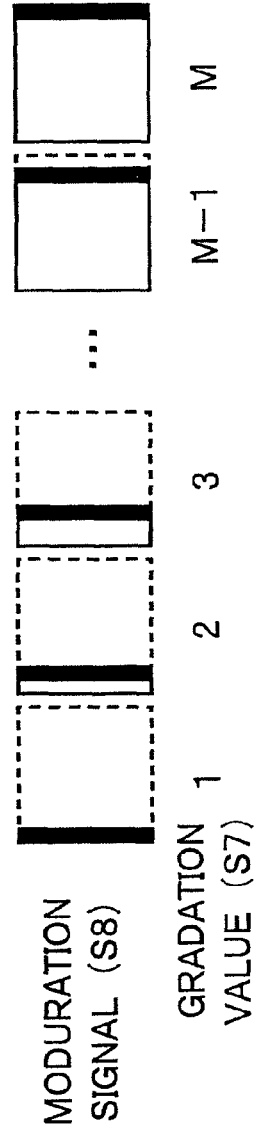

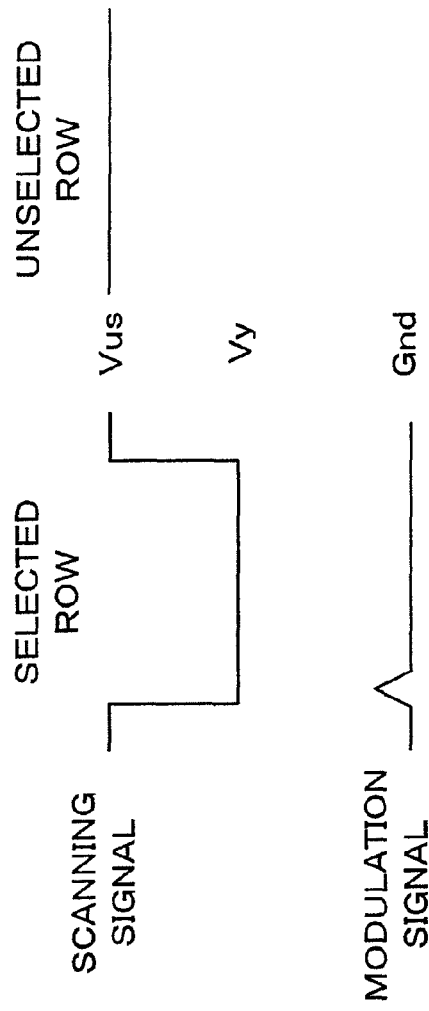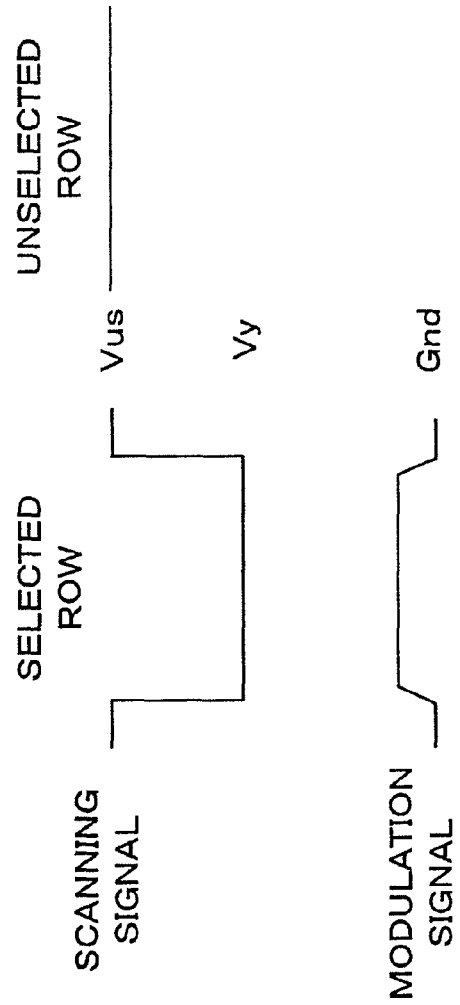
FIG. 3A
FIG. 3B

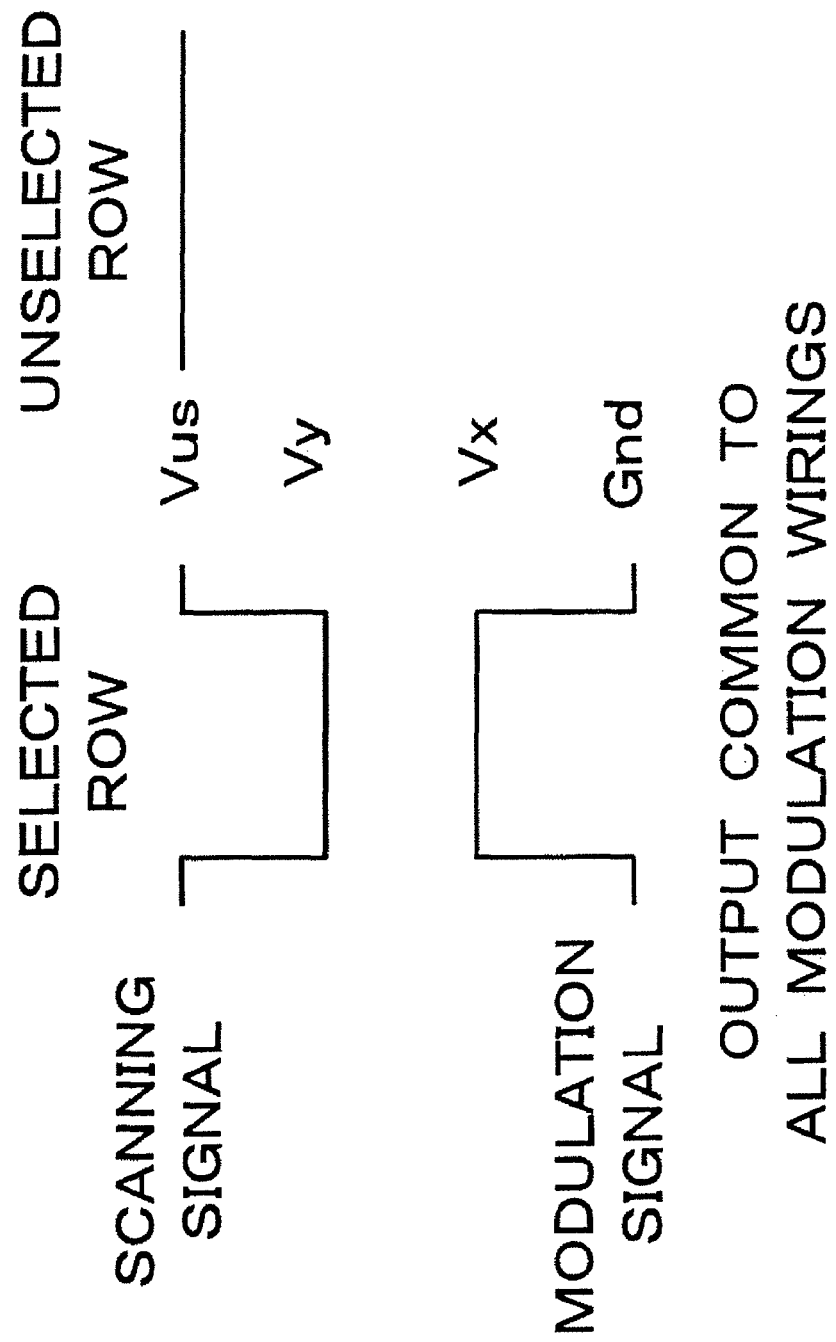

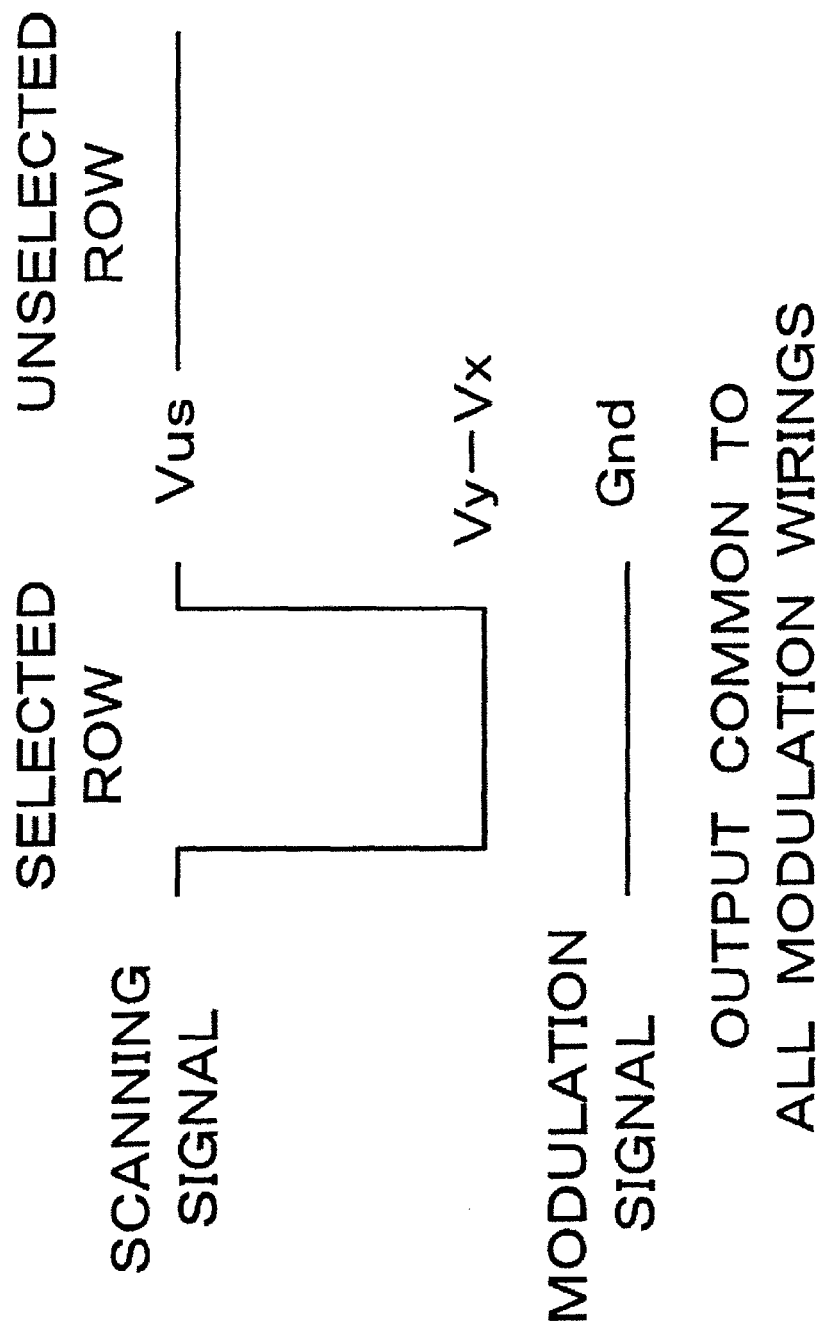

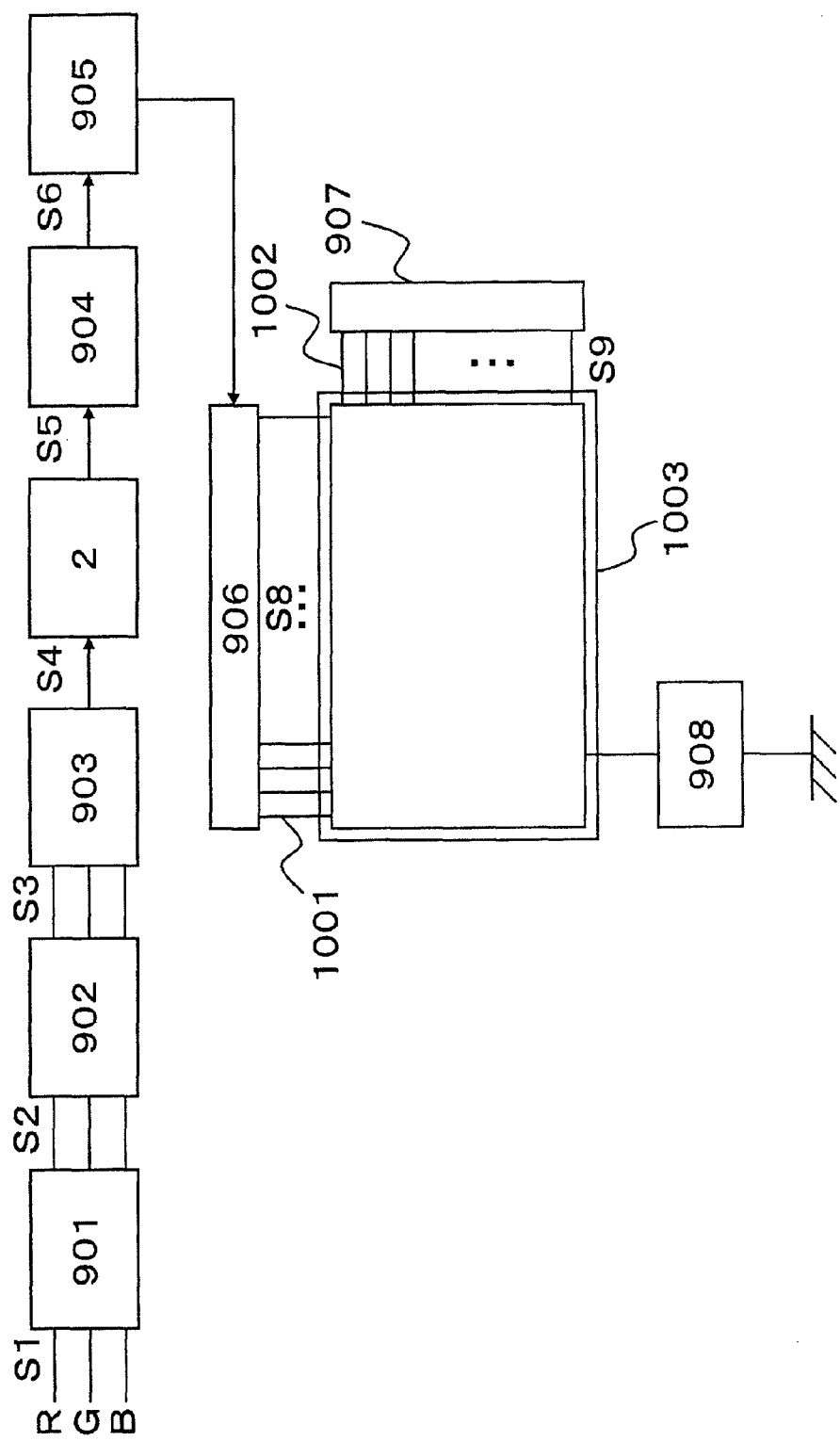

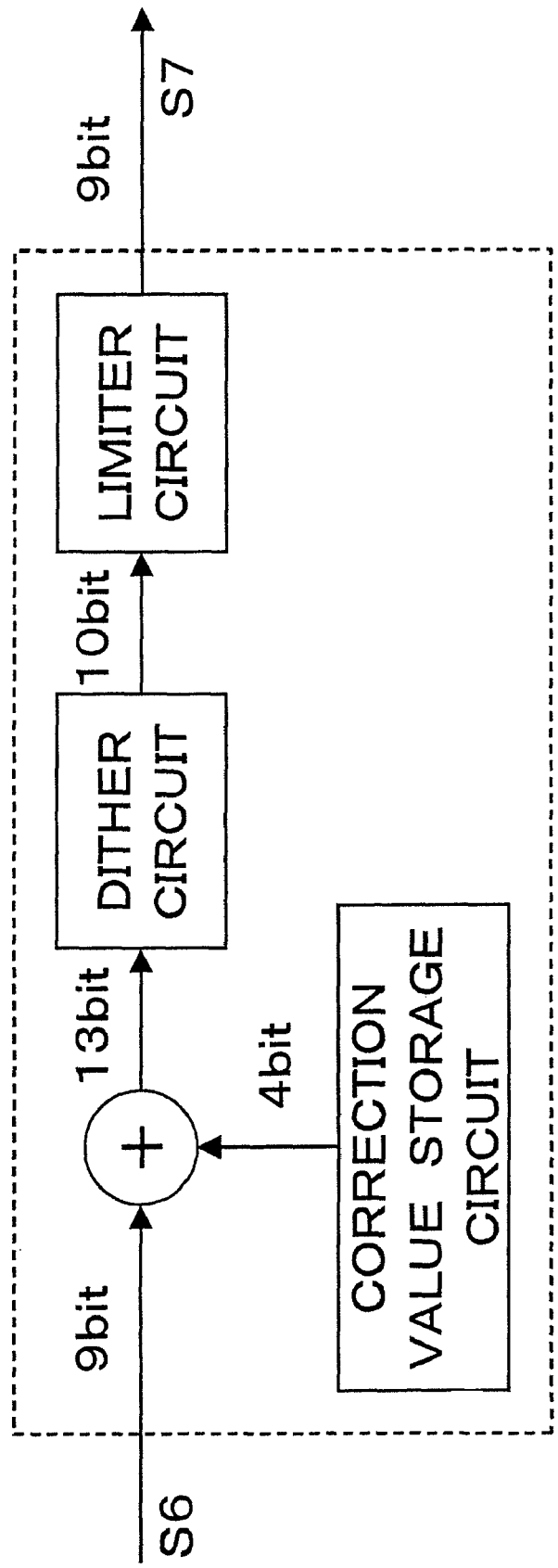

FIG. 9
<FIRST STEP>
DISPLAY FIRST IMAGE
AND CALCULATE
FIRST LUMINANCE VALUE
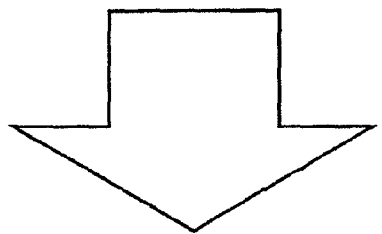
<SECOND STEP>
DISPLAY SECOND IMAGE
AND CALCULATE
SECOND LUMINANCE VALUE
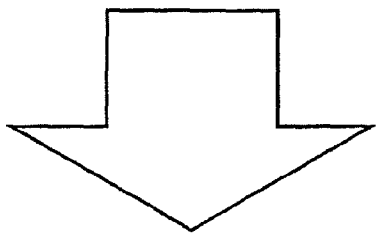
<THIRD STEP>
CALCULATE CORRECTION VALUE
FROM FIRST LUMINANCE VALUE
AND SECOND LUMINANCE VALUE

FIG. 10
<FIRST STEP>
DISPLAY FIRST IMAGE
AND CALCULATE
FIRST LUMINANCE VALUE
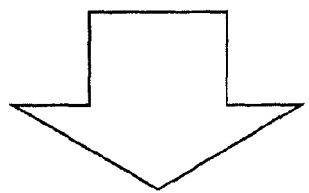
<SECOND STEP>
DISPLAY SECOND IMAGE
AND CALCULATE
SECOND LUMINANCE VALUE
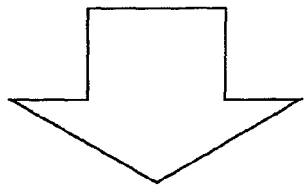
<FOURTH STEP>
DISPLAY THIRD IMAGE
AND CALCULATE
THIRD LUMINANCE VALUE
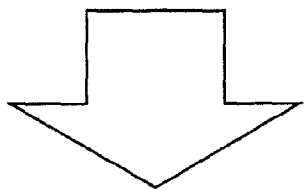
<THIRD STEP>
CALCULATE CORRECTION VALUE
USING FIRST TO THIRD
LUMINANCE VALUE

CORRECTION METHOD

BACKGROUND OF THE INVENTION

1. Field of the Invention

The present invention relates to a correction method of luminance unevenness in an image display apparatus.

2. Description of the Related Art

A liquid crystal display apparatus (LCD), a plasma display apparatus (PDP), a field emission type display apparatus (FED), an organic EL display apparatus (OLED), and so on are available as flat screen display apparatuses (FPDs).

With this type of flat screen display apparatus, a large number of display elements must be formed on a substrate. Characteristics of the display elements are affected by slight differences in manufacturing conditions and the like. Therefore, it is typically difficult to make the characteristics of all of the display elements included in the FPD perfectly uniform. Non-uniformity in the display characteristics causes luminance variation (luminance unevenness) on the display apparatus, leading to deterioration in image quality.

For example, in an FED, electron-emitting devices of surface emission type, Spindt type, MIM type, and carbon nanotube type are used as display elements. When a shape or the like of an electron-emitting device varies due to differences in the manufacturing conditions of the electron-emitting device and so on, the electron emission characteristic of the electron-emitting device also varies. As a result, luminance unevenness occurs on the FED, leading to a deterioration of the image quality.

In constitution proposed in response to this problem, an image signal (luminance data) is corrected in accordance with a light emission characteristic of each display element.

For example, a constitution in which correction value tables are provided for all gradations of the display elements has been proposed (see Japanese Patent Application Laid-open No. 2000-122598). However, when this constitution is employed, the volume of the required correction value tables increases as the number of display elements and the number of gradations increase. Further, large increases occur in the amount of time required for measurements and calculations used to determine the correction value tables. Hence, there is demand for a method with which the volume of the correction value tables can be reduced (leading to reductions in cost and difficulty) and accurate correction values can be determined in a short amount of time.

A conventional technique relating to this problem is disclosed in the specification of U.S. Pat. No. 6,097,356, for example. More specifically, in the constitution disclosed in the specification of U.S. Pat. No. 6,097,356, a correction value table is provided only in relation to a specific gradation instead of providing correction value tables for all gradations. Correction values for gradations not provided with a correction value table are then obtained by interpolating the correction value table using a linear function or a higher order function.

In another proposed constitution (see Japanese Patent Application Laid-open No. 2006-047510), luminance unevenness caused by differences in the resistance and the capacitance of scanning wirings and modulation wirings is reduced by providing correction data for correcting the differences in the resistance and capacitance of the scanning wirings and modulation wirings.

SUMMARY OF THE INVENTION

However, it is not always possible with these conventional constitutions to correct luminance unevenness sufficiently in an image display apparatus that uses elements having greatly varying display element characteristics, such as organic EL elements and electron-emitting devices.

A case in which luminance unevenness in a simple matrix-driven FED employing a pulse width modulation (PWM) system is corrected using the constitution disclosed in the specification of U.S. Pat. No. 6,097,356 will now be described as an example. In this case, luminance unevenness in the vicinity of the gradation provided with the correction value table and luminance unevenness caused by a variation in the electron emission characteristic can be reduced comparatively favorably. However, luminance unevenness occurs in the form of stripes (vertical stripes and horizontal stripes) on a low gradation side and at the gradations using correction values obtained through interpolation (the gradations at which luminance measurement is not performed to determine the correction value).

Further, when the constitution disclosed in Japanese Patent Application Laid-open No. 2006-047510 is employed, luminance unevenness (low frequency luminance unevenness) that varies gently in a panel surface due to the resistance and capacitance of the scanning wirings and modulation wirings can be reduced comparatively favorably. However, when high-frequency luminance unevenness other than luminance unevenness caused by an electric characteristic distribution in the panel surface occurs randomly, it is difficult to determine a correction value for correcting this luminance unevenness, and therefore the luminance unevenness cannot be reduced sufficiently.

The present inventor has discovered that a characteristic variation (characteristic differences) among modulation circuits that apply modulation signals to the respective display elements is the main cause of the aforesaid stripe-shaped luminance unevenness occurring on the low gradation side and randomly occurring high-frequency luminance unevenness. More specifically, the present inventor discovered that the main cause of the aforesaid luminance unevenness is the lack of uniformity in the characteristics of a plurality of ICs (or a plurality of channels within the ICs) constituting a plurality of modulation circuits.

FIG. 1 shows an example of pulse voltage fall timings (deviation from a reference value) of respective output channels in a case where the plurality of modulation circuits (PWM modulation circuits) are constituted by four drive ICs (a single drive IC has eighty output channels). It is evident from FIG. 1 that the fall timing varies by approximately 25% depending on the output channel. On a displayed image, a position (line) corresponding to a display element driven using an output channel having a late fall timing brightens, while a position (line) corresponding to a display element driven using an output channel having an early fall timing darkens. As a result, stripe-shaped luminance unevenness (stripe unevenness) is caused by variation in the fall timing, leading to a deterioration in image quality. Furthermore, a variation in the fall timing differs not only according to the output channel but also among the ICs. In other words, fall timing variation can be divided into a first mode (offset) representing variation among the ICs, a second mode (internal IC distribution) representing the unique variation within each IC, and a third mode (individual variation) representing random variation among the channels.

However, to measure the fall timing variation among the respective channels (the respective modulation circuits), the following conditions must be satisfied, making such an operation unrealistic.

(1) Measurement must be performed with an error of nanoseconds or less.
(2) Measurement must be performed quickly.
(3) A dedicated tester must be developed.
(4) Luminance unevenness caused by a variation in manufacturing conditions occurring when the modulation circuits are packaged in the image display apparatus must be taken into account.

A method of measuring signals output from the respective channels electrically may be considered as a method of measuring the fall timing variation among the channels in a state where drive circuits (scanning circuit, modulation circuit) are packaged in the image display apparatus. However, such a method is unrealistic in terms of measurement precision and time.

Hence, there exists demand for a method of determining correction values easily and precisely.

The present invention provides a technique with which correction values for correcting luminance unevenness caused by characteristic differences among modulation circuits can be determined easily and precisely.

According to the present invention, a correction method can be employed by a correction circuit in an image display apparatus having a plurality of display elements disposed in a matrix shape, a plurality of scanning wirings, a plurality of modulation wirings, a scanning circuit that applies a scanning signal to the display elements via the scanning wirings, a plurality of modulation circuits provided respectively for the modulation wirings to apply a modulation signal to the display elements via the modulation wirings, and the correction circuit, which corrects luminance unevenness caused by characteristic differences among the modulation circuits. The correction method comprises the steps of: correcting input luminance data using a correction value; and generating the modulation signal on the basis of the corrected luminance data. The correction value is determined using a correction value determination method comprising: a first step of measuring a luminance value of each of the display elements by displaying a first image including luminance unevenness caused by characteristic differences among the display elements and the luminance unevenness caused by characteristic differences among the modulation circuits, and calculating a first luminance value serving as a representative luminance value of the display elements for each of the modulation circuits from a result of the measurement; a second step of measuring the luminance value of each of the display elements by displaying a second image in which the luminance unevenness caused by characteristic differences among the modulation circuits is smaller than that of the first image displayed in the first step, and calculating a second luminance value serving as a representative luminance value of the display elements for each of the modulation circuits from a result of the measurement; and a third step of calculating the correction value corresponding to each of the modulation circuits using a value obtained by dividing the first luminance value by the second luminance value.

An image display apparatus according to the present invention comprising a plurality of display elements disposed in a matrix shape, a plurality of scanning wirings, a plurality of modulation wirings, a scanning circuit that applies a scanning signal to the display elements via the scanning wirings, a plurality of modulation circuits provided respectively for the modulation wirings to apply a modulation signal to the display elements via the modulation wirings, and a correction circuit that corrects luminance unevenness caused by characteristic differences among the modulation circuits. The correction circuit stores a correction value for each modulation circuit, and the correction value is determined using a correction value determination method including: a first step of measuring a luminance value of each of the display elements by displaying a first image including luminance unevenness caused by characteristic differences among the display elements and the luminance unevenness caused by characteristic differences among the modulation circuits, and calculating a first luminance value serving as a representative luminance value of the display elements for each of the modulation circuits from a result of the measurement; a second step of measuring the luminance value of each of the display elements by displaying a second image in which the luminance unevenness caused by characteristic differences among the modulation circuits is smaller than that of the first image displayed in the first step, and calculating a second luminance value serving as a representative luminance value of the display elements for each of the modulation circuits from a result of the measurement; and a third step of calculating the correction value corresponding to each of the modulation circuits using a value obtained by dividing the first luminance value by the second luminance value.

According to the present invention, correction values for correcting luminance unevenness caused by characteristic differences among modulation circuits can be determined easily and precisely.

Further features of the present invention will become apparent from the following description of exemplary embodiments with reference to the attached drawings.

BRIEF DESCRIPTION OF THE DRAWINGS

FIG. 1 is a view showing an example of pulse voltage fall timings in modulation circuits;

FIGS. 2A to 2C are views showing examples of a modulation signal;

FIGS. 3A and 3B are views showing examples of modulation signals applied in a first step and a second step;

FIGS. 4A to 4C are views showing examples of modulation signals applied in a first step and a second step;

FIGS. 5A and 5B are schematic diagrams showing an image display apparatus;

FIG. 7 is a view showing an example of the constitution of a modulation signal correction unit according to this embodiment;

FIG. 9 is a view showing an example of the flow of a correction value determination method.

FIG. 10 is a view showing an example of the flow of a correction value determination method.

DESCRIPTION OF THE EMBODIMENTS

Figure 4A:
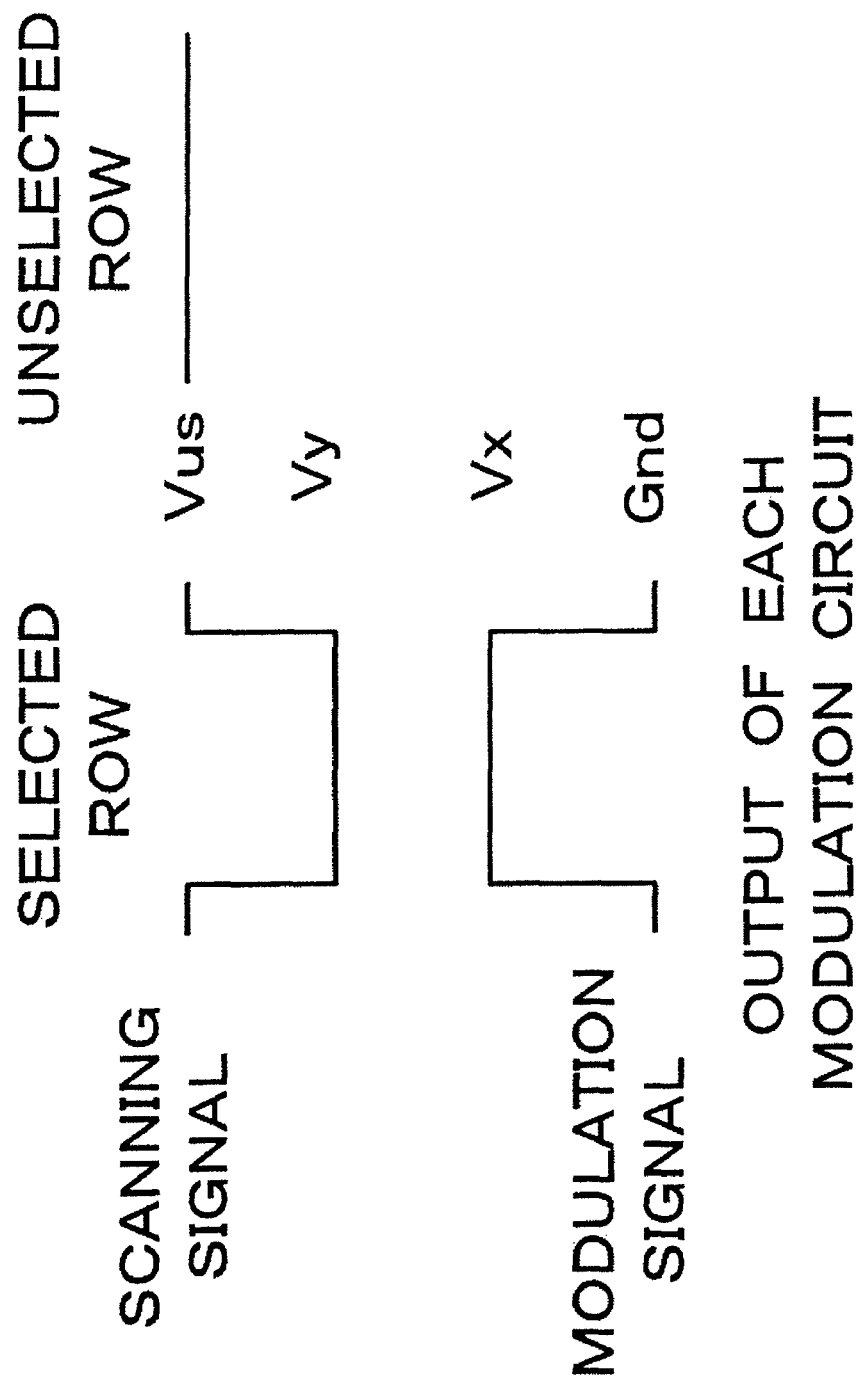

A correction value determination method according to this embodiment is employed to determine a correction value used by a correction circuit in an image display apparatus having a plurality of display elements disposed in matrix form, a plurality of scanning wirings, a plurality of modulation wirings, a scanning circuit, a plurality of modulation circuits, and the correction circuit. The scanning circuit applies a scanning signal to the display elements via the scanning wirings. The plurality of modulation circuits are provided for the respective modulation wirings and apply a modulation signal to the display elements in synchronization with the scanning signal. The correction circuit corrects luminance unevenness caused by characteristic differences among the modulation circuits.

Further, with the correction value determination method according to this embodiment, the correction value for correcting luminance unevenness caused by characteristic differences among the modulation circuits can be determined with a high degree of precision. The present invention can therefore be applied favorably to an image display apparatus in which luminance unevenness caused by characteristic differences among the modulation circuits appears on an image to a striking degree.

More specifically, in a case where simple matrix driving is implemented using modulation circuits including PWM (modulation circuits that modulate at least a pulse width of a modulation signal), the pulse width is far smaller (a duty decreases in accordance with a number of scanning lines) than that of a case in which active matrix driving is implemented. Therefore, luminance unevenness (stripe unevenness) caused by characteristic differences among the modulation circuits occurs more obviously. For example, when an image display apparatus having 1080 scanning wirings, a 120 Hz frame frequency, and a 10-bit gradation (1024 gradations) is subjected to PWM driving, a single horizontal scanning period is approximately 8 µs (≈1/120/1080 s). The period of a single gradation, meanwhile, corresponds to approximately 8 ns (≈8/1024 µs). Hence, when the pulse width varies by 8 ns, a luminance value varies by approximately 0.1% (≈8 ns/8 µs) when a gradation value is 1024, approximately 10% when the gradation value is 10, and approximately 100% when the gradation value is 1. Accordingly, the present invention can be applied favorably to an impulse type image display apparatus having display elements that are subjected to simple matrix driving using modulation circuits including PWM. Note that with the correction value determination method according to this embodiment, correction values can be determined regardless of whether the modulation system (the modulation circuits) employs PAW (pulse amplitude modulation), PWM (pulse width modulation), or another system.

Further, when a voltage amplitude varies by 10 mV in a PAM driven image display apparatus having a 10 V maximum voltage amplitude and a 10-bit gradation, the voltage varies by approximately 0.1% (≈10 mV/10 V) when the gradation value is 1024, approximately 10% when the gradation value is 10, and approximately 100% when the gradation value is 1. When a voltage-luminance characteristic is linear, this voltage unevenness leads directly to luminance unevenness. Furthermore, in an EL element or an electron-emitting device, the luminance value varies exponentially relative to the applied voltage, and therefore this type of luminance unevenness occurs even more strikingly. Accordingly, the present invention can be applied favorably to an image display apparatus having EL elements or field emission electron-emitting devices (electron-emitting devices) that are driven using modulation circuits including PAM. Note that with the correction value determination method according to this embodiment, a correction value can be determined regardless of the display element type.

Moreover, when a correction value determined by the correction value determination method according to this embodiment is used, luminance unevenness caused by characteristic differences among the modulation circuits can be corrected precisely regardless of the magnitude of luminance unevenness caused by characteristic differences among the display elements.

(First Determination Method)

An example of a correction value determination method according to this embodiment (a first determination method) will now be described.

First, an example of a method for determining a correction value corresponding to a single gradation value will be described.

In the first determination method, as shown in FIG. 9, the correction value is determined via first to third steps. In the first step, an image (a first image) including luminance unevenness caused by characteristic differences among the display elements and luminance unevenness caused by characteristic differences among the modulation circuits is displayed. The luminance value of each display element is then measured, whereupon a first luminance value serving as a representative luminance value of the display elements is calculated for each modulation circuit from the measurement results. In the second step, an image (a second image) including less luminance unevenness caused by characteristic differences among the modulation circuits than the first image displayed in the first step is displayed by driving the plurality of display elements driven in the first step. The luminance value of each display element is then measured, whereupon a second luminance value serving as a representative luminance value of the display elements is calculated for each modulation circuit from the measurement results. In the third step, a correction value corresponding to each modulation circuit is calculated using a value obtained by dividing the first luminance value by the second luminance value.

The first image is displayed by applying modulation signals from the plurality of modulation circuits to the plurality of modulation wirings, respectively. The modulation signals applied to the respective modulation wirings in order to display the first image are preferably signals having a low gradation side waveform (a waveform with a small pulse width) in the case of a PWM system, for example. A waveform having a small pulse width is greatly affected by characteristic differences among the modulation circuits (fall timing variation), and therefore the first image can be displayed by employing this type of signal.

The second image is displayed by applying a common modulation signal to the plurality of modulation wirings from a single modulation circuit, for example. More specifically, all of the modulation wirings are connected by a conductor jig such that a common potential is applied to all of the modulation wirings. As a result, the second image can be displayed. This method can be used favorably in a PAM system such as that shown in FIG. 2B. With a PAM system, the low gradation side can be depicted more easily than with a PWM system, but since a highly precise voltage is required, characteristic differences among the modulation circuits are more likely to appear as luminance unevenness.

Further, the luminance unevenness caused by characteristic differences among the display elements is preferably equal in the first image and the second image. More specifically, when the display elements are electron-emitting devices, as disclosed in Japanese Patent Application Laid-open No. 2008-145494 and so on, luminance unevenness caused by characteristic differences among the display elements is caused by a variation in a voltage-emission current characteristic of the display elements. In other words, characteristic differences among the display elements are dependent on the applied voltage. Therefore, in the second step, a scanning signal and a modulation signal (driving signals) are preferably applied such that the potential difference between the scanning signal and the modulation signal is equal to the potential difference of the first step. More specifically, when driving signals such as those shown in FIG. 4A are used in the first step, identical driving signals to those shown in FIG. 4A should be applied to the respective modulation wirings from a single modulation circuit in the second step, as shown in FIG. 4B. As long as the potential difference between the scanning signal and the modulation signal is equal to the potential difference of the first step, the ratio between the scanning signal and the modulation signal may be made different from a ratio of the first step, as shown in FIG. 4C.

Further, an image displayed by applying modulation signals having a larger pulse width than that of the modulation signals applied when displaying the first image to the plurality of modulation wirings from the plurality of modulation circuits, respectively, may be set as the second image. This method may be applied in a case where the modulation circuit is a circuit than outputs a modulation signal such as that shown in FIG. 2A, a PWM circuit such as that shown in FIG. 2C, and so on, for example. By increasing the pulse width, the characteristic differences among the modulation circuits (fall timing variation) become substantially negligible, and therefore the second image can be displayed without using the aforementioned conductor jig (i.e. with a simpler constitution).

Further, in the first and second steps, the luminance value of each display element is measured by driving the display elements without correcting the luminance unevenness. At this time, measurement is preferably performed separately for R, G and B (i.e. for each of the display element colors) in order to increase the measurement precision (to obtain highly precise correction values).

For example, when the measurement is performed on a display element corresponding to R, line-sequential driving may be implemented in a scanning direction by applying the aforementioned modulation signal only to the display elements (modulation wirings) corresponding to R. At this time, a Gnd voltage may be applied to the display elements (modulation wirings) corresponding to G and B. Thus, the display elements connected to the selected row and column are driven, whereby an image including luminance unevenness caused by characteristic differences among the display elements corresponding to R (and in the first step also including luminance unevenness caused by characteristic differences among the modulation circuits corresponding to R) is displayed. The luminance value of each display element is then measured using a CMOS camera, a CCD camera, or similar.

Furthermore, in the first and second steps, at least one display element may be driven for each wiring. For example, in a full HD (columns×rows=1920×1080 pixels) image display apparatus, it is assumed that three display elements (R, G, B display elements) constituting a single pixel are arranged in a row direction and the modulation wirings are column wirings (wirings shared by the display elements arranged in a column direction). In this case, at least 5760 display elements corresponding respectively to 5760 (=1920×3) modulation wirings may be driven. The luminance value of each display element may then be set as a first luminance value of the modulation circuit connected to the corresponding display element. Further, when the characteristic differences among the modulation circuits occur in IC units, at least one display element may be driven in relation to each IC.

Note that a plurality of display elements (100, for example) may be driven for each wiring and an average value of the luminance values of the display elements may be used as the first luminance value. In so doing, a measurement error in the luminance value can be reduced. Further, the first luminance value and the second luminance value may take values normalized by an average value of the luminance values of all of the display elements, as shown in expressions 1 and 2.

$$L_X^1(K) = \frac{\sum_{Y=1}^{100} L_{X,Y}^1(K)}{100} \times \frac{5760 \times 100}{\sum_{X=1}^{5760} \left( \sum_{Y=1}^{100} L_{X,Y}^1(K) \right)} \quad \text{[expression 1]}$$

$L_{X,Y}^1(K)$: Luminance value of display elements connected to modulation wiring X, scanning wiring Y when first image corresponding to gradation value K is displayed.

$L_X^1(K)$: First luminance value corresponding to modulation circuit (wiring) X when first image corresponding to gradation value K is displayed.

$$L_X^2(K) = \frac{\sum_{Y=1}^{100} L_{X,Y}^2(K)}{100} \times \frac{5760 \times 100}{\sum_{X=1}^{5760} \left( \sum_{Y=1}^{100} L_{X,Y}^2(K) \right)} \quad \text{[expression 2]}$$

$L_{X,Y}^2(K)$: Luminance value of display elements connected to modulation wiring X, scanning wiring Y when first image corresponding to gradation value K is displayed.

$L_X^2(K)$: Second luminance value corresponding to modulation circuit (wiring) X when second image corresponding to gradation value K is displayed.

Thus, a reference (unit) of a component of the first luminance value and second luminance value that is caused by characteristic differences among the display elements can be standardized.

The first luminance value includes components caused by characteristic differences among the display elements and characteristic differences among the modulation circuits. In the second luminance value, the component caused by characteristic differences among the modulation circuits is smaller than that of the first luminance value (preferably, the component caused by characteristic differences among the display elements is equal to that of the first luminance value and the component caused by characteristic differences among the modulation circuits is zero). By dividing the first luminance value by the second luminance value, a luminance ratio expressing the component caused by characteristic differences among the modulation circuits can be obtained. Further, by multiplying an inverse of the luminance ratio by an input image signal (luminance data), the luminance unevenness caused by characteristic differences among the modulation circuits can be corrected. In the third step, a value obtained by dividing the second luminance value by the first luminance value is set as the correction value. Note that the correction value is not limited to this value, and the correction value determination method may be set appropriately in accordance with differences in the correction method and circuit configuration.

Hence, a correction value for correcting luminance unevenness caused by characteristic differences among the modulation circuits can be determined easily.

Depending on the modulation circuit configuration and correction circuit configuration, in certain cases it may be necessary to determine a correction value in relation to each gradation value, while in other cases it may be possible to determine the correction value in relation to a single gradation value.

More specifically, when a typical PWM system is employed, modulation signals for each gradation value are generated in a common site of the modulation circuit (a wiring, a buffer, or the like that transmits a clock pulse), and therefore the characteristic differences among the modulation circuits are constant regardless of the gradation value. Hence, a correction value may be determined in relation to a single gradation value, whereupon the correction value can be applied to all gradation values.

When a PAM system is employed, on the other hand, the modulation signals for each gradation value are generated using independent sites of the modulation circuit (a ladder resistance, an output resistance, an output amp, and so on), and therefore the characteristic differences among the modulation circuits differ for each gradation value due to variation among these sites. Hence, a correction value is required for each gradation value.

When a correction value is required for each gradation value, modulation signals corresponding to different gradation values should be applied respectively to the plurality of display elements connected to a single modulation wiring in the first and second steps. For example, to determine 100 correction values corresponding respectively to gradation values 1 to 100, the luminance value of each display element is measured by driving the display elements of a first row, the display elements of a second row, . . . , and the display elements of a one hundredth row using a modulation signal corresponding to a gradation value 1, a modulation signal corresponding to a gradation value 2, . . . , and a modulation signal corresponding to a gradation value 100, respectively. In so doing, a plurality of correction values corresponding respectively to a plurality of gradation values can be determined at once. Note that the voltage-emission current characteristic of the display elements is fixed, and therefore, in the second step, the luminance value of each display element is measured for several gradation values, whereupon the luminance values corresponding to the remaining gradation values can be determined by interpolating the measurement values using an appropriate function. By employing this method, the second step can be simplified.

(Second Determination Method)

Another example of a correction value determination method according to this embodiment (a second determination method) will now be described. Note that the description of parts that are identical to the first determination method has been omitted.

In the second determination method, as shown in FIG. 10, a fourth step is performed between the second step and the third step shown in FIG. 9.

In the fourth step, a third image having a different luminance to the first image is displayed, whereupon the luminance value of each display element is measured and a third luminance value serving as a representative luminance value of the display elements is calculated for each modulation circuit from the measurement results, as shown in expression 3 (similarly to the first and second luminance values).

$$L_X^4(K) = \frac{\sum_{Y=1}^{100} L_{X,Y}^1(K+1)}{100} \times \frac{5760 \times 100}{\sum_{X=1}^{5760}\left(\sum_{Y=1}^{100} L_{X,Y}^1(K)\right)} \quad \text{[expression 3]}$$

$L_{X,Y}^1(K+1)$: Luminance value of display elements connected to modulation wiring X, scanning wiring Y when third image corresponding to gradation value K+1 is displayed.

$L_X^4(K)$: Third luminance value corresponding to modulation circuit (wiring) X when third image corresponding to gradation value K+1 is displayed.

More specifically, the third image is displayed by applying modulation signals corresponding to gradation values that are larger by one than the gradation values of the modulation signals applied in the first step from the plurality of modulation circuits to the plurality of modulation wirings, respectively. Note that the modulation signals for displaying the third image are not limited thereto, and may be modulation signals corresponding to gradation values that are smaller by one than the gradation values of the modulation signals applied in the first step or modulations signals corresponding to gradation values that are larger (or smaller) by three or five. Typically, when a variation occurs in the voltage-emission current characteristic of the display elements, the relationship between the luminance and the modulation signal (gradation value) also varies among the display elements, and therefore the third luminance value is preferably calculated for each display element. Note, however, that when the variation among the display elements is sufficiently small, the gradation dependency of the luminance value becomes substantially identical among the display elements, and therefore the third luminance value may be calculated in relation to a part of the display elements and applied to all of the modulation circuits.

In the third step of the second determination method, as shown in expression 4, the difference between the value obtained by dividing the first luminance value by the second luminance value and 1 is calculated.

$$D_X^1(K) = \frac{\left(\frac{L_X^1(K)}{L_X^2(K)} - 1\right)}{\left(\frac{L_X^4(K) - L_X^1(K)}{L_X^1(K)}\right)} \quad \text{[expression 4]}$$

$D_X^1(K)$: Example of correction value corresponding to gradation value K of modulation circuit (wiring) X.

In the expression 4, 1 is subtracted from the value obtained by dividing the first luminance value by the second luminance value (the value obtained by dividing the first luminance value by the second luminance value may be subtracted from 1). This difference is then normalized by the gradation dependency of the luminance value. More specifically, the difference is normalized by the rate of change between the first luminance value and the third luminance value ((third luminance value−first luminance value)/first luminance value). In so doing, the variation among the modulation signals (corresponding to the gradation values) can be calculated. When this value is set as the correction value, luminance unevenness caused by characteristic differences among the modulation circuits can be corrected by adding/subtracting the correction value to/from the image signal (luminance data).

Further normalization may be performed such that the maximum value of the value calculated in the third step reaches zero, for example. In other words, a "difference from the maximum value" may be set as the correction value. By adding this correction value to the image signal, luminance unevenness caused by characteristic differences among the modulation circuits can be corrected. More specifically, correction can be performed such that a display element that has a late fall timing and therefore brightens when uncorrected is driven by an unmodified signal (correction value=0) while a display element that has a small delay time and therefore darkens when uncorrected is driven by a brightening signal (a positive correction value). Furthermore, normalization may also be performed such that a minimum value of the value calculated in the third step reaches zero, and moreover, positive and negative correction values may coexist.

According to the second determination method, the variation corresponding to the gradation value is set as the correction value. Therefore, when this correction value is employed, luminance unevenness caused by characteristic differences among the modulation circuits can be corrected more easily and more precisely than when the correction value determined according to the first determination method is employed. More specifically, when the correction value determined according to the second determination method is employed, luminance unevenness caused by characteristic differences among the modulation circuits can be corrected by adding/subtracting the correction value to/from the image signal. Hence, in comparison with a case in which the correction value is multiplied by the image signal, correction can be performed with a smaller processing load and a simpler (cheaper) circuit configuration. Furthermore, when the correction value determined according to the first determination method is used, a slight correction error may occur while converting the image signal (linear data) into a modulation signal (non-linear data). More specifically, a slight correction error may occur due to the variation in the relationship between the luminance value and the modulation signal (gradation value) due to variation in the voltage-emission current characteristic of the display elements. In the second determination method, normalization is performed using the rate of change between the first luminance value and the third luminance value, and therefore this type of error can be canceled (error factors other than a luminance unevenness measurement error do not intrude). Hence, in comparison with the first determination method, a more accurate correction value can be determined.

(Correction Method)

A correction method according to this embodiment should be capable of correcting a modulation signal using the correction value determined by the determination method according to this embodiment. More specifically, the correction method should be capable of correcting input luminance data and generating a modulation signal on the basis of the corrected luminance data. In the correction method according to this embodiment, there are no particular limitations on the form of the correction value, the type of signal subjected to correction, and the specific configuration of a correction circuit. In other words, the correction method may be designed appropriately in accordance with differences in the employed correction system.

(Image Display Apparatus)

The image display apparatus (and particularly the correction circuit) according to this embodiment will now be described.

The correction circuit according to this embodiment includes a storage circuit that stores a correction value (the correction value determined by the determination method according to this embodiment) for correcting luminance unevenness, and a calculation circuit that calculates the correction value.

For example, when characteristic differences among the modulation circuits occur in each IC, correction values (offset correction values) corresponding to the respective ICs should be stored in the storage circuit in a number corresponding to the number of ICs. When the characteristic differences among the modulation circuits have unique distributions within the respective ICs, a correction value for each IC should be stored in the storage circuit together with correction values (IC internal distribution correction values) corresponding to the unique distributions, which are stored in a number corresponding to the number of channels within the IC. When characteristic differences among the modulation circuits occur randomly in each modulation circuit, correction values (channel correction values) for all modulation circuits (all channels) should be stored in the storage circuit.

Further, when a correction value is required for each gradation, a correction value table corresponding to each modulation circuit and each gradation should be stored in the storage circuit. Even when this correction value table is created, the volume of the correction value table is smaller than the volume of a correction value table for all of the display elements, such as that disclosed in Japanese Patent Application Laid-open No. 2000-122598, by a difference in power. For example, when an 8-bit precision correction value table is created for a full HD image display apparatus that can display 256 gradations using the constitution of Japanese Patent Application Laid-open No. 2000-122598, the volume thereof is 1920 (columns)×3 (RGB)×1080 (rows)×256 (gradations)×8 bits (quantization precision)≈1.6 G. When the present constitution is used, on the other hand, the volume of the created correction value table is 1920 (columns)×3 (RGB)×256 (gradations)×8 bits (quantization precision)≈1.5 M.

The correction calculation circuit should be constituted such that the modulation signal is corrected on the basis of the correction value corresponding to the characteristic differences among the modulation circuits. Further, the characteristic differences among the modulation circuits are typically smaller than a minimum pitch of the modulation signal (the modulation signal pitch corresponding to a single gradation), and therefore the precision of the correction value is limited to the minimum pitch of the modulation signal. Hence, the minimum pitch of the modulation signal is preferably subdivided artificially by providing a dither circuit such as an FRC. Further, when the modulation signal is corrected, the value of the signal may be no greater than a minimum value of the modulation signal, or no smaller than a maximum value thereof, and therefore an appropriate limiter circuit is preferably provided.

With the constitution described above, display can be performed without luminance unevenness (stripe unevenness) caused by characteristic differences among the modulation circuits.

Furthermore, by implementing correction processing such as that disclosed in the specification of U.S. Pat. No. 6,097,356 in a state where luminance unevenness caused by characteristic differences among the modulation circuits has been suppressed through implementation of the correction processing according to this embodiment, a favorable image devoid of luminance unevenness that cannot be fully corrected by the processing disclosed in the specification of U.S.

Pat. No. 6,097,356 alone can be displayed. Note that the correction method according to this embodiment is a method for correcting luminance unevenness caused by characteristic differences among the modulation circuits, and the method of correcting luminance unevenness caused by characteristic differences among the display elements is not limited to the method disclosed in the specification of U.S. Pat. No. 6,097, 356.

Example

A specific example of the present invention will now be described. In an image display apparatus according to this example, (surface emission type) electron-emitting devices serving as display elements are subjected to simple matrix driving using a PWM system including through rate control, as shown in FIG. 2A. A method of manufacturing a surface emission type electron-emitting device and characteristics thereof are disclosed in Japanese Patent Application Laid-open No. H2-56822 and so on, for example.

(Outline of Image Display Apparatus)

Figure 5B:
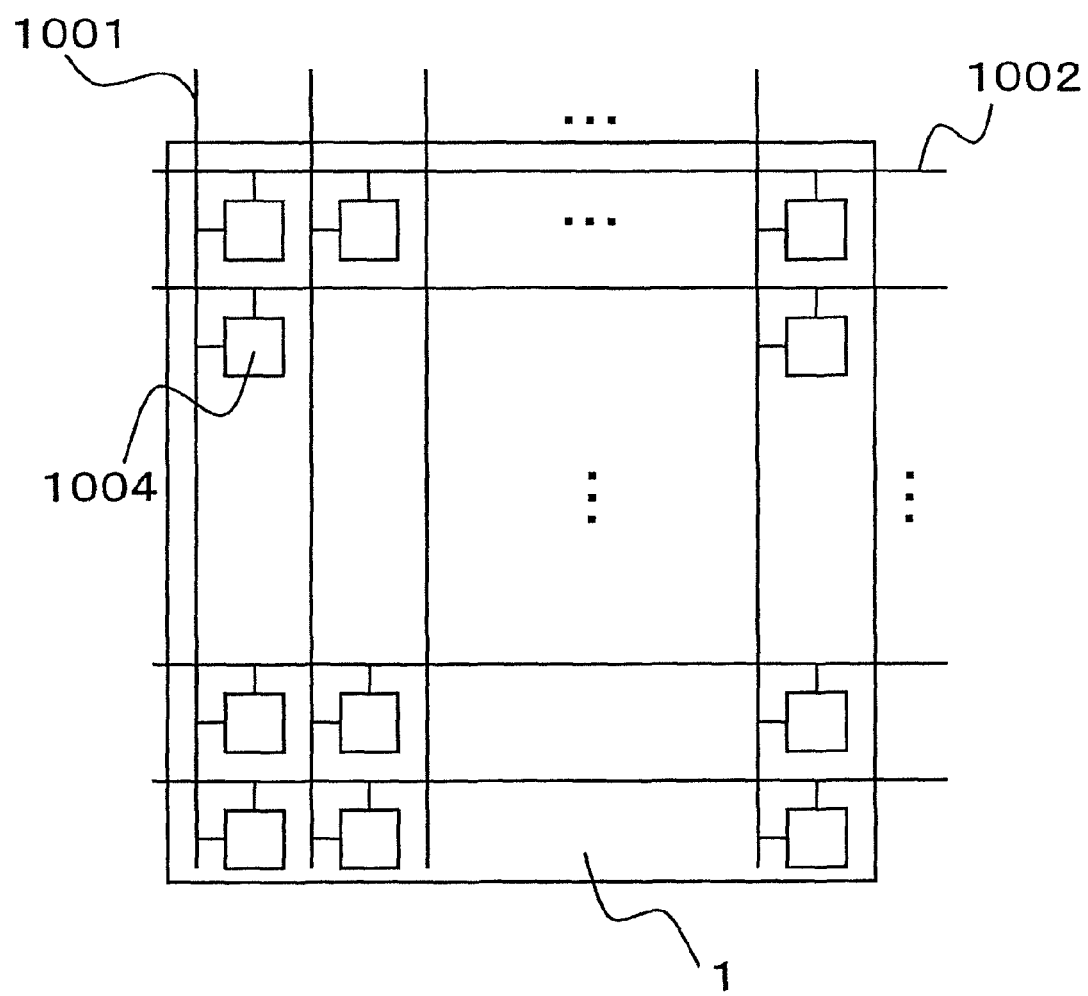

FIG. 5A is a view showing the overall constitution of the image display apparatus. As shown in FIG. 5B, reference numeral 1 denotes a matrix panel (display panel) having matrix wiring. As shown in FIGS. 5A and 5B, reference numeral 1001 denotes a modulation wiring, reference numeral 1002 denotes a scanning wiring, reference numeral 1003 denotes a face plate to which a high voltage is applied, and reference numeral 2 denotes an IV unevenness correction unit for correcting luminance unevenness caused by variation among the display elements. Reference numeral 901 denotes an RGB input unit for receiving a digital image signal, and reference numeral 902 denotes a gradation correction unit for performing reverse gamma correction on the image signal. Reference numeral 903 denotes a data rearrangement unit for rearranging image data input in RGB parallel in accordance with an array of RGB phosphor on the matrix panel, and reference numeral 904 is a linearity correction circuit for correcting a nonlinearity characteristic of a modulation driver and a saturation characteristic of the phosphor. Reference numeral 905 denotes a modulation signal correction unit for correcting characteristic differences among the modulation circuits. Reference numeral 906 denotes the modulation driver, reference numeral 907 denotes a scanning driver, and reference numeral 908 denotes a high voltage source. The RGB input unit 901, the gradation correction unit 902, the data rearrangement unit 903, the IV unevenness correction unit 2, the linearity correction circuit 904, the modulation signal correction unit 905, the modulation driver 906, the scanning driver 907, and the high voltage source 908 together constitute a drive circuit according to this example. Further, the modulation driver 906 includes 24 drive ICs, each having 240 outputs (240 channels) (for a total 5760 channels (modulation circuits). FIG. 5B is a pattern diagram showing a rear plate of the matrix panel 1. The matrix panel 1 is constituted by the rear plate, a frame, and the face plate, and the interior thereof is maintained as a vacuum. In FIG. 5B, reference numeral 1001 denotes the modulation wirings, reference numeral 1002 denotes the scanning wirings, and reference numeral 1004 denotes electron-emitting devices. The matrix panel 1 according to this example includes 1080 rows of the scanning wirings 1002 and 1920×3 (=5760) columns of the modulation wirings 1001.

(Signal Flow)

The RGB input unit 901 converts an input digital component signal S1 into an image signal S2 corresponding to a display resolution. When the image signal S2 has been subjected to gamma correction in accordance with a CRT characteristic, the gradation correction unit 902 performs reverse gamma correction on the image signal S2 and then outputs an output signal S3. The gradation correction unit 902 is preferably constituted by a memory storing a correction value table for use during the reverse gamma correction. The data rearrangement unit 903 rearranges the output signal S3 output by the gradation correction unit 902 and outputs RGB image data S4 corresponding to the phosphor array of the matrix panel. The image data S4 have been subjected to reverse gamma correction by the gradation correction unit 902, and therefore constitute data (to be referred to hereafter as "luminance data") having a value that is commensurate with the luminance. In this example, the luminance data are 14-bit (16383 gradation) data. The IV unevenness correction unit 2 corrects luminance unevenness caused by a variation among the display elements in relation to the luminance data S4 and outputs first corrected data S5. The first corrected data S5 are data that have been expanded to 16 bits (65535 gradations) in order to improve correction precision on the low gradation side. The linearity correction circuit 904 corrects the saturation characteristic of the phosphor and the nonlinearity characteristic of the modulation driver 906 in relation to the first corrected data S5 so that final luminance data are commensurate with the luminance value of the display elements, and outputs second corrected data S6. When the saturation characteristic of the phosphor differs among the colors R, G, B, the linearity correction circuit 904 preferably holds different correction value tables for each color R, G, B. In this example, the second corrected data S6 are set at 9 bits (511 gradations), identically to the number of gradations of the modulation circuits, and these data are input into the modulation signal correction unit 905. The modulation signal correction unit 905 corrects luminance unevenness caused by characteristic differences among the modulation circuits in relation to the second corrected data S6 and outputs third corrected data S7 (the final luminance data) to the modulation driver 906. The scanning driver 907 outputs a selected potential (scanning pulse) S9 to the scanning wiring 1002 of a driven line, and the modulation driver 906 outputs a modulation signal S8 generated on the basis of the luminance data (the third corrected data S7) to the modulation wiring 1001. A voltage waveform formed by a potential difference between the scanning pulse and the modulation signal serves as a drive signal for driving the electron-emitting devices 1004. Of the electron-emitting devices 1004 connected to the scanning wiring 1002 to which the selected potential is supplied, electrons are emitted from elements in which the voltage of the drive signal exceeds a predetermined value. The emitted electrons are accelerated by a voltage applied to a metal back (not shown) of the face plate 1003 from the high voltage source 908, thereby colliding with the phosphor. As a result, the phosphor emits light such that an image is formed.

(Modulation Signal)

Next, the modulation signal of the modulation driver 906 will be described. In this example, the matrix panel is driven using a system in which the pulse width and pulse amplitude are modulated through variation, such as that shown in FIG. 2A. In FIG. 2A, the ordinate shows a voltage value and the abscissa shows time, and driving waveforms (S8 in FIG. 2A) at each gradation value (S7 in FIG. 2A) are arranged laterally. Here, the gradation values are the possible signal levels of the modulation signal in numerically ascending order, and correspond to the output of the modulation signal correction unit (S7 in FIG. 5A). The modulation signal takes a triangular waveform up to a gradation value n=100 and a trapezoidal waveform from a gradation value 101 to a gradation value 511, and when the gradation increases by one, the fall timing of the waveform is retarded by 25 [ns]. The drive voltage is Vx=10 [V], Vy=−8 [V], Vus=5 [V]. Here, S4 and S5 are data having a value that is commensurate with the luminance, whereas S6 and S7 are data that are nonlinear with respect to the luminance.

(Correction Value Determination Method)

Next, a correction value determination method will be described. First, the first image is displayed using a modulation signal such as that shown in FIG. 3A (here, a modulation signal corresponding to a gradation value S7=50), without performing any of the corrections. A maximum wave height value of the modulation signal at this time is approximately 5.0 [V] (=10 [V]×50 gradations/100 gradations). The first image is displayed after being divided into R, G, B components. More specifically, to measure the luminance unevenness of the R image, a modulation signal having the gradation value S7 is applied to the R modulation wirings and modulation signals having a gradation value 0 are applied to the G and B modulation wirings. Further, the respective scanning wirings are driven in line order. The luminance unevenness of the G and B images can be measured similarly. As a result, an image that exhibits luminance unevenness corresponding to variation in the characteristics of the display elements (the electron emission characteristic) and characteristic differences among the modulation circuits is displayed. In this state, the luminance value of each display element is measured using a CMOS camera, a CCD camera, or similar. Then, in this example, the luminance values of the display elements of 1920×3×100 lines are measured to obtain the first luminance value in which a measurement error is suppressed. More specifically, as shown in expression 1, of the obtained 1920×3×100 luminance values, the measurement values of 100 elements that are driven by an identical modulation circuit X are averaged, and as a result, 1920×3 values corresponding to the respective modulation circuits are obtained. A value obtained by normalizing these values using an average value of the 1920×3×100 (=576000) luminance values is then set as the first luminance value.

The second image is then displayed using a modulation signal such as that shown in FIG. 3B, whereupon the second luminance value is calculated from the respective luminance values of the display elements when the second image is displayed using a similar method to the method employed to calculate the first luminance value. Note that in this example, the waveform of the modulation signal for displaying the second image has a pulse width that is equal to the pulse width of the waveform corresponding to the gradation value 511 and a maximum wave height value of approximately 5.0 [V] (an identical value to the maximum wave height value of the modulation signal used to display the first image).

Similarly, the third image is displayed using a modulation signal corresponding to the gradation value (S7=51), whereupon the third luminance value is calculated from the respective luminance values of the display elements when the third image is displayed using a similar method to the method employed to calculate the first and second luminance values. In this example, the modulation signal for displaying the third image corresponds to a gradation value that is larger by one than the gradation value of the modulation signal for displaying the first image.

The correction value is then determined by performing a calculation such as that shown in expression 4 using the first to third luminance values obtained in the manner described above.

Figure 6A:
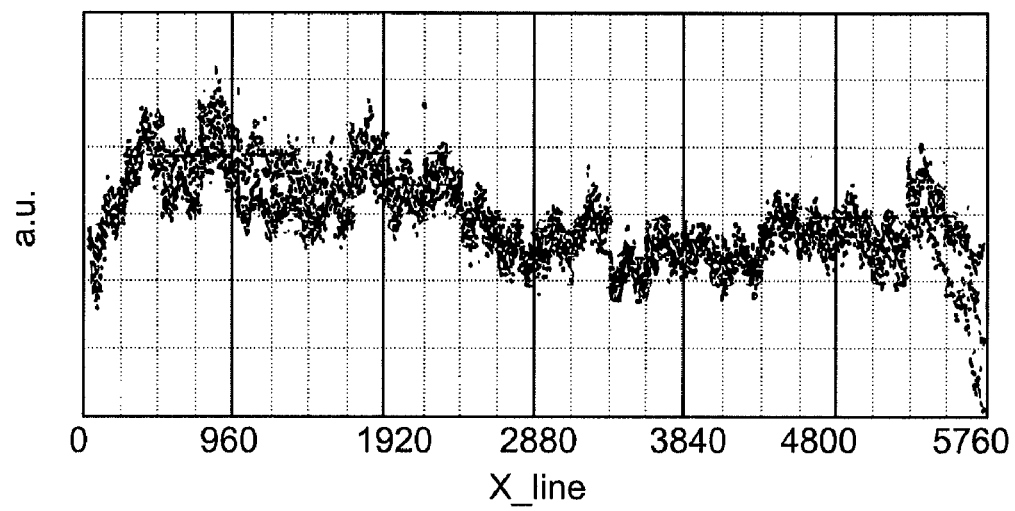
FIGS. 6A to 6D are views showing examples of the first to third luminance values and a correction value.
Figure 6B:
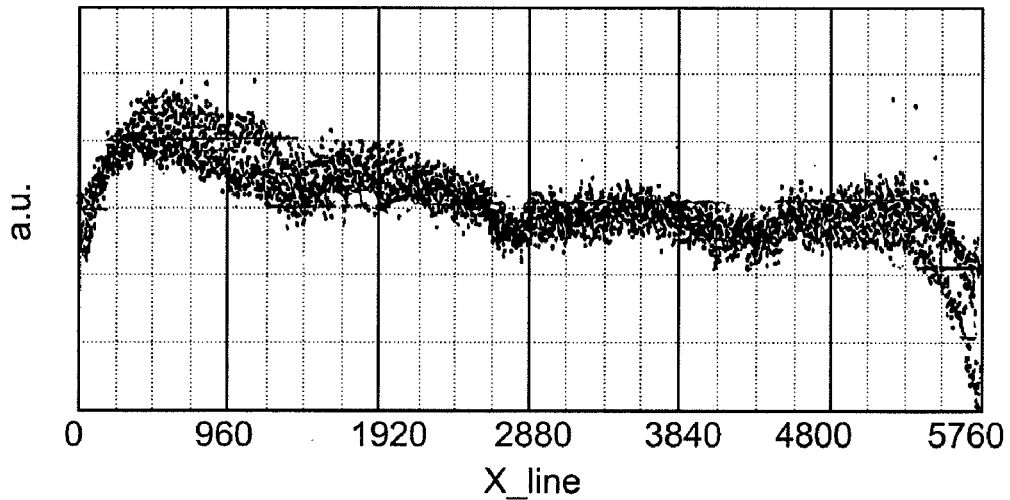
Figure 6C:
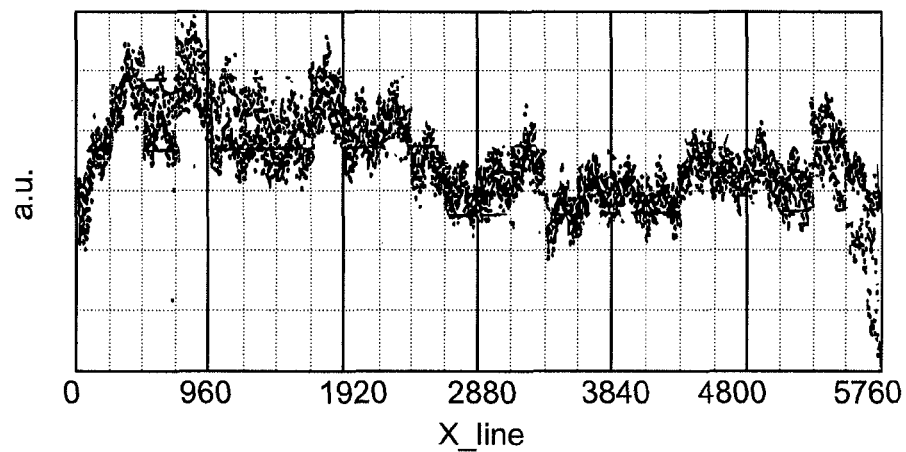
Figure 6D:
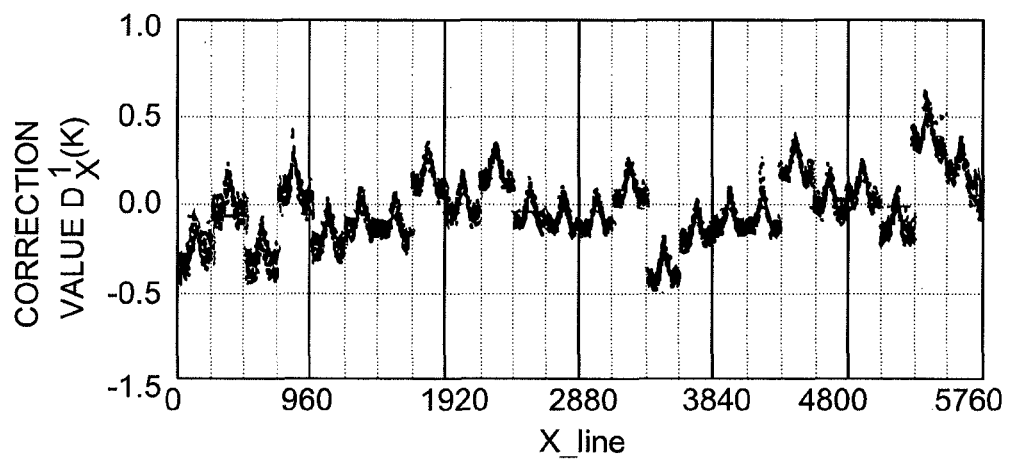

The first to third luminance values calculated as described above and the result of the calculation shown in expression 4 are shown in FIGS. 6A to 6D. FIG. 6A shows the first luminance value. This value includes components caused by both characteristic differences among the display elements and characteristic differences among the modulation circuits. FIG. 6B shows the second luminance value. This value includes a component caused by characteristic differences among the display elements (the component caused by characteristic differences among the modulation circuits is smaller than that of the value shown in FIG. 6A). FIG. 6C shows the third luminance value. This value includes luminance corresponding to one more gradation than the value shown in FIG. 6A. FIG. 6D shows the result of the calculation of expression 4. As is evident from expression 4, since a "luminance ratio caused by characteristic differences among the modulation circuits" is normalized by an "increase rate of the luminance value when the gradation value is increased by one", this value corresponds to a value obtained by converting the characteristic differences among the 5760 modulation circuits into gradation value differences. It can be seen from FIG. 6D that similarly shaped profiles are arranged cyclically in each 240 lines. This corresponds to the unique modulation circuit variation of the drive IC, i.e. a variation that is dependent on the constitution of a wiring or a buffer for transmitting a clock pulse in a PWM circuit. It can also be seen that offset occurs randomly in each 240 lines. This offset variation corresponds to a variation in a threshold voltage of each drive IC. The other high frequency variation corresponds to characteristic variation (individual variation) among the respective channels of the drive IC.

In this example, the correction value is determined by setting a maximum value of the result of the calculation shown in expression 4 at zero, as shown in expression 5.

$$D_X^2(K) = \text{Round}((\text{Max}(D_X^1(K):X=1\sim5760)-D_X^1(K))\times 2^4)$$ [expression 5]

Round(VARIABLE): Integer value obtained when decimal places VARIABLE are rounded off.

$D_X^2(K)$: Example of correction value corresponding to gradation value K of modulation circuit (wiring) X.

Furthermore, the variation corresponding to the gradation value is no larger than one gradation and the modulation signal pitch of a single gradation is approximately 15% at almost all gradation values, and therefore the correction value is quantized at a precision of one sixteenth of a single gradation (4 bits) in order to obtain a correction precision of 1% or less.

(Correction Circuit)

Next, the modulation signal correction unit that employs the correction value described above to perform an accurate correction will be described using FIG. 7. The modulation signal correction unit is constituted by a storage circuit that stores the correction value, an adder that adds the correction value to the modulation signal, a dither circuit that generates an artificial gradation from an added gradation, and a limiter circuit that limits a generated signal to a maximum value of modulation signal when the generated signal exceeds the maximum value.

The storage circuit for storing the correction value is constituted to store 5760 4-bit correction values corresponding to the respective modulation circuits so that a random individual variation among the channels can be corrected.

The output S6 of the linearity correction circuit 904 is 9 bits.

The adder adds 4 bits corresponding to the correction value to the output S6 as is to expand the output S6 to 13 bits.

The dither circuit converts a signal output from the adder into a 10-bit signal constituted by the gradation value (9 bits)+a dither gradation value (1 bit). With the converted signal, a resolution corresponding to 13 bits can be obtained using a 4-bit artificial gradation of the dither.

The limiter circuit operates to output 9-bit full data when 10-bit full data of a maximum signal are input and output other data as is when the other data are input. Here, the 10-bit full data constitute a signal corresponding to the maximum gradation value. When the pulse width of the modulation signal corresponding to this gradation value is sufficiently long, luminance unevenness caused by characteristic differences among the modulation circuits (delay time variation) is negligible, and therefore the effect of the limitation applied by the limiter circuit can be ignored.

The output S7 (9-bit data) of the limiter circuit is output to the modulation driver, whereupon display in which characteristic differences among the modulation circuits has been corrected is performed.

(Post-Correction Uniformity)

Figure 8A:
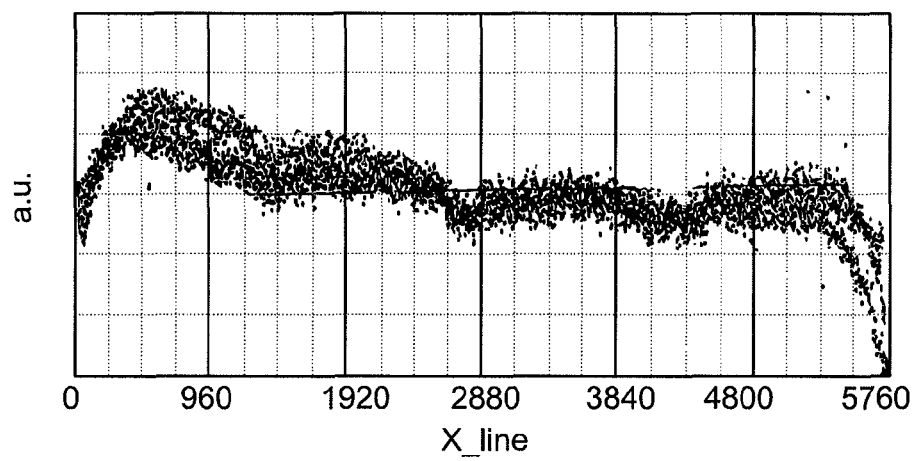
FIGS. 8A and 8B are views showing effects of this embodiment.
Figure 8B:
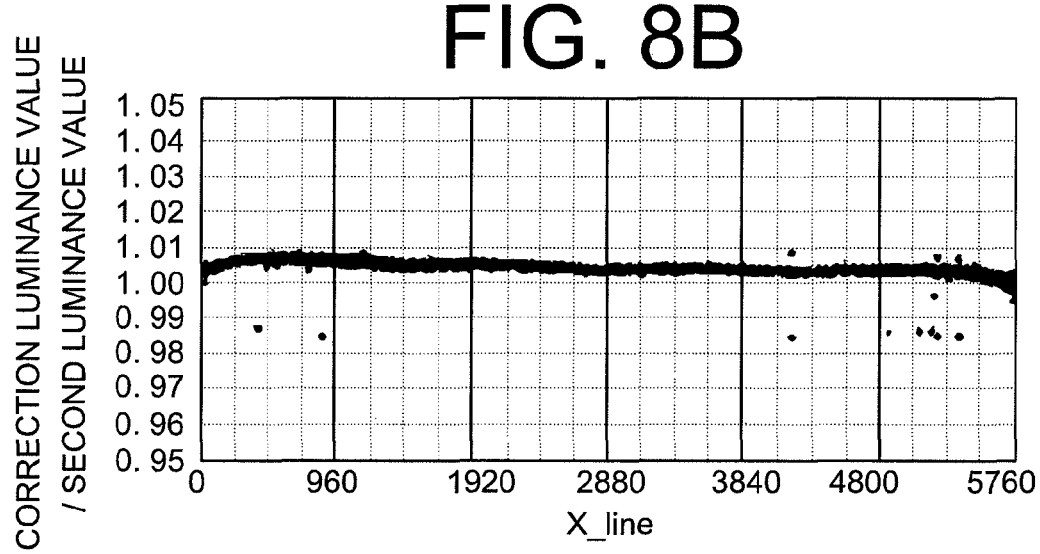

Next, to confirm the effects of this example, an image was displayed using a modulation signal corresponding to the gradation value 50 following the modulation signal correction processing, and the luminance value of each display element was measured. FIG. 8A shows a measurement result (a representative value calculated using a similar calculation method to that of the first to third luminance values). When the correction functions favorably, a variation (luminance unevenness (stripe unevenness)) in the luminance values due to characteristic differences among the modulation circuits does not exist in FIG. 8A and only a variation in the luminance values due to characteristic differences among the display elements appears. To confirm this, the value shown in FIG. 8A was divided by the value of the second luminance value (FIG. 6B), which mainly includes the component caused by characteristic differences among the display elements. FIG. 8B shows the result. As is evident from FIG. 8B, it can be confirmed that luminance unevenness caused by characteristic differences among the modulation circuits was suppressed to 1% or less.

Further, IV unevenness correction processing was performed using the constitution disclosed in the specification of U.S. Pat. No. 6,097,356 following the modulation signal correction processing. A method of correcting luminance unevenness caused by characteristic differences among the display elements is not directly related to the present application, and therefore a detailed description thereof has been omitted. However, a basic circuit configuration is disclosed in Japanese Patent Application Laid-open No. 2008-145494, for example. More specifically, correction values were determined in two gradation ranges, namely a high gradation side and a low gradation side, whereupon the gradation values were interpolated using an optimum function. To confirm the effects of this example, the entire panel surface was illuminated and uniformity was checked visually following the IV unevenness correction processing and the modulation signal correction processing. As a result, no stripe-shaped luminance unevenness was found. Moreover, almost no luminance unevenness caused by characteristic differences among the display elements was found. Furthermore, by determining correction values in relation to three or more gradation values on the low gradation side, it was possible to suppress luminance unevenness caused by characteristic differences among the display elements in a very low gradation region (for example, a range of 0 to 25% from a lowest gradation value of the entire gradation range).

As described above, with the correction value determination method according to this embodiment, the first luminance value, which includes a component caused by characteristic differences among the display elements and a component caused by characteristic differences among the modulation circuits, and the second luminance value, in which the component caused by characteristic differences among the modulation circuits is smaller than that of the first luminance value, are calculated. A correction value corresponding to each modulation circuit is then calculated using a value obtained by dividing the first luminance value by the second luminance value. As a result, the correction value for correcting luminance unevenness caused by characteristic differences among the modulation circuits can be determined with a high degree of precision. Moreover, the first and second luminance values are calculated from the luminance values of the respective display elements when an image is displayed using different modulation signals, and therefore the correction value determination method can be realized with a simple constitution.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-180736, filed on Aug. 3, 2009, which is hereby incorporated by reference herein in its entirety.

What is claimed is:

1. A correction method employed by a correction circuit in an image display apparatus having a plurality of display elements disposed in a matrix shape, a plurality of scanning wirings, a plurality of modulation wirings, a scanning circuit that applies a scanning signal to the display elements via the scanning wirings, a plurality of modulation circuits provided respectively for the modulation wirings to apply a modulation signal to the display elements via the modulation wirings, and the correction circuit, which corrects luminance unevenness caused by characteristic differences among the modulation circuits, the correction method comprising the steps of:

correcting input luminance data using a correction value; and generating the modulation signal on the basis of the corrected luminance data, wherein the correction value is determined using a correction value determination method comprising:

a first step of measuring a luminance value of each of the display elements by displaying a first image including luminance unevenness caused by characteristic differences among the display elements and the luminance unevenness caused by characteristic differences among the modulation circuits, and calculating a first luminance value serving as a representative luminance value of the display elements for each of the modulation circuits from a result of the measurement;

a second step of measuring the luminance value of each of the display elements by displaying a second image in which the luminance unevenness caused by characteristic differences among the modulation circuits is smaller than that of the first image displayed in the first step, and calculating a second luminance value serving as a representative luminance value of the display elements for each of the modulation circuits from a result of the measurement of the luminance value of each of the display elements by displaying the second image; and a third step of calculating the correction value corresponding to each of the modulation circuits using a value obtained by dividing the first luminance value by the second luminance value.

2. The correction method according to claim 1, wherein the first image is displayed by applying modulation signals to the plurality of modulation wirings from the plurality of modulation circuits, respectively, and the second image is displayed by applying a common modulation signal to the plurality of modulation wirings from a single modulation circuit.

3. The correction method according to claim 1, wherein the first image is displayed by applying modulation signals to the plurality of modulation wirings from the plurality of modulation circuits, respectively, and the second image is displayed by applying modulation signals having a larger pulse width than the modulation signals applied to display the first image, to the plurality of modulation wirings from the plurality of modulation circuits, respectively.

4. The correction method according to claim 1, wherein the correction value is an inverse of the value obtained by dividing the first luminance value by the second luminance value.

5. The correction method according to claim 1,
wherein the correction value determination method further comprises a fourth step of measuring the luminance value of each of the display elements by displaying a third image having a different luminance from the first image, and calculating a third luminance value serving as a representative luminance value of the display elements for each of the modulation circuits from a result of the measurement of measuring the luminance value of each of the display elements by displaying a third image, and
wherein the correction value is obtained by normalizing the difference between the value obtained by dividing the first luminance value by the second luminance value and 1 using the rate of change between the first luminance value and the third luminance value.

6. An image display apparatus comprising:
a plurality of display elements disposed in a matrix shape;
a plurality of scanning wirings;
a plurality of modulation wirings;
a scanning circuit that applies a scanning signal to the display elements via the scanning wirings;
a plurality of modulation circuits provided respectively for the modulation wirings to apply a modulation signal to the display elements via the modulation wirings; and
a correction circuit that corrects luminance unevenness caused by characteristic differences among the modulation circuits,
wherein the correction circuit stores a correction value for each modulation circuit, and
wherein the correction value is determined using a correction value determination method including:
a first step of measuring a luminance value of each of the display elements by displaying a first image including luminance unevenness caused by characteristic differences among the display elements and the luminance unevenness caused by characteristic differences among the modulation circuits, and calculating a first luminance value serving as a representative luminance value of the display elements for each of the modulation circuits from a result of the measurement;
a second step of measuring the luminance value of each of the display elements by displaying a second image in which the luminance unevenness caused by characteristic differences among the modulation circuits is smaller than that of the first image displayed in the first step, and calculating a second luminance value serving as a representative luminance value of the display elements for each of the modulation circuits from a result of the measurement of the luminance value of each of the display elements by displaying the second image; and
a third step of calculating the correction value corresponding to each of the modulation circuits using a value obtained by dividing the first luminance value by the second luminance value.

* * * * *